(12) United States Patent
Kusumi et al.

(10) Patent No.: US 9,248,838 B2
(45) Date of Patent: Feb. 2, 2016

(54) SYSTEM AND METHOD FOR A ONE-TIME DEPARTURE SCHEDULE SETUP FOR CHARGING BATTERY-ELECTRIC VEHICLES

(71) Applicant: Toyota Motor Engineering & Manufacturing North America, Inc., Erlanger, KY (US)

(72) Inventors: Hidetoshi Kusumi, Gardena, CA (US); Hisanori Ito, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/723,768

(22) Filed: May 28, 2015

(65) Prior Publication Data

US 2015/0258998 A1    Sep. 17, 2015

Related U.S. Application Data

(62) Division of application No. 13/664,236, filed on Oct. 30, 2012, now Pat. No. 9,045,042.

(60) Provisional application No. 61/624,143, filed on Apr. 13, 2012.

(51) Int. Cl.
*B60W 50/00* (2006.01)
*B60L 1/00* (2006.01)
(Continued)

(52) U.S. Cl.
CPC ............ *B60W 50/0098* (2013.01); *B60L 1/003* (2013.01); *B60L 11/1816* (2013.01); *B60L 11/1848* (2013.01); *B60L 11/1862* (2013.01); *B60W 10/26* (2013.01); *B60W 10/30* (2013.01); *B60W 50/085* (2013.01);
(Continued)

(58) Field of Classification Search
USPC .......................................................... 701/22
See application file for complete search history.

(56) References Cited

U.S. PATENT DOCUMENTS 5,552,693 A * 9/1996 Nishikawa ................ G05F 1/56
                                                    320/148
6,188,202 B1 * 2/2001 Yagi ...................... H02J 7/0081
                                                    320/125
(Continued)

OTHER PUBLICATIONS

*Blink Wall Mount Charging System Owner's Manual;* ECOtality, Inc.; copyright 2010; 54 pages.

*Primary Examiner* — Thomas Tarcza
*Assistant Examiner* — Alex C Dunn
(74) *Attorney, Agent, or Firm* — Snell & Wilmer LLP

(57) ABSTRACT

A method and a system for making a one-time change to a primary departure schedule of a battery-electric vehicle for charging or pre-climate operations without affecting the future departure times of the primary departure schedule. The system can be a vehicle including an ECU, a memory, a battery, a charger connected to an external power source, a BMS, an HVAC and a display. The method may include receiving an alternate departure date and time different from the primary departure schedule, deactivating the charging or pre-climate operations based on the primary departure schedule and activating charging or pre-climate operations based on the alternate departure date and time. The method and system may also include receiving an immediate charge mode designation, deactivating the charging or pre-climate operations based on the primary schedule and immediately activating the charging operations without affecting the primary departure schedule.

20 Claims, 4 Drawing Sheets

(51) Int. Cl.
*B60L 11/18* (2006.01)
*B60W 10/26* (2006.01)
*B60W 10/30* (2006.01)
*B60W 50/08* (2012.01)

(52) U.S. Cl.
CPC ......... *B60L 2240/34* (2013.01); *B60L 2250/14* (2013.01); *B60L 2250/16* (2013.01); *B60W 2050/0004* (2013.01); *Y02T 10/7005* (2013.01); *Y02T 10/705* (2013.01); *Y02T 10/7044* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 7,698,078 B2 | 4/2010 | Kelty et al. | |
| 7,778,746 B2 | 8/2010 | McLeod et al. | |
| 7,999,665 B2 | 8/2011 | Chander et al. | |
| 8,947,052 B2 * | 2/2015 | Nishizawa | H01M 10/441 320/134 |
| 2002/0109506 A1 * | 8/2002 | Kawakami | G01R 31/3679 324/522 |
| 2005/0189917 A1 * | 9/2005 | Satou | H02J 7/0052 320/128 |
| 2008/0036425 A1 * | 2/2008 | Tashiro | H01M 10/486 320/154 |
| 2009/0079388 A1 | 3/2009 | Reddy | |
| 2010/0082277 A1 | 4/2010 | Ballard | |
| 2010/0174667 A1 | 7/2010 | Vitale et al. | |
| 2010/0301810 A1 | 12/2010 | Biondo et al. | |
| 2011/0007824 A1 | 1/2011 | Bridges et al. | |
| 2011/0016063 A1 | 1/2011 | Pollack et al. | |
| 2011/0109266 A1 | 5/2011 | Rossi | |
| 2011/0118919 A1 * | 5/2011 | Park | B60H 1/00392 701/22 |
| 2011/0140660 A1 | 6/2011 | Potter | |
| 2011/0191220 A1 | 8/2011 | Kidston et al. | |
| 2012/0053771 A1 | 3/2012 | Yoshida | |
| 2012/0262122 A1 * | 10/2012 | Sato | H02J 7/00 320/128 |

* cited by examiner

SYSTEM AND METHOD FOR A ONE-TIME DEPARTURE SCHEDULE SETUP FOR CHARGING BATTERY-ELECTRIC VEHICLES

CLAIM OF PRIORITY AND INCORPORATION BY REFERENCE

This application is a divisional of U.S. Non-Provisional application Ser. No. 13/664,236, titled "SYSTEM AND METHOD FOR A ONE-TIME DEPARTURE SCHEDULE SETUP FOR CHARGING BATTERY-ELECTRIC VEHICLES" and filed on Oct. 30, 2012, now U.S. Pat. No. 9,045,042, which claims the benefit and priority of U.S. Provisional Application No. 61/624,143, filed on Apr. 13, 2012, titled "SYSTEM AND METHOD FOR A ONE-TIME DEPARTURE SCHEDULE SET UP." This application hereby claims the benefit of and priority to, and incorporates by reference the entire contents of both U.S. Non-Provisional application Ser. No. 13/664,236 and U.S. Provisional Application No. 61/624,143.

BACKGROUND

1. Field

The present invention relates to a method and a system for setting a one-time departure schedule for time-based electric vehicle charging, and more particularly to a method and a system for charging immediately or setting a one-time temporary departure schedule without changing the primary departure schedule.

2. Description of the Related Art

With global energy prices rapidly increasing, vehicle manufacturers are seeking novel ways to manufacture a vehicle incorporating a battery which can be recharged according to the daily needs of a user. For example, a vehicle may charge a battery according to a departure schedule which includes expected dates and times of departure for using the vehicle. This primary departure schedule repeats periodically, such as weekly. The vehicle may also activate a Heating, Ventilation and Air Conditioning (HVAC) unit to perform a pre-climate operation in advance of a departure time. The pre-climate operation allows the interior climate of the vehicle to be adjusted according to user's preferences at the departure time.

A drawback of setting a primary departure schedule has been that a user cannot deviate from a previously set primary departure schedule without having to invest additional time to edit the primary departure schedule. When a user seeks to immediately charge a vehicle or make a one-time change only for the next departure, the user has to invest additional time to re-input the primary departure schedule after making the temporary change even if the user prefers to leave the primary departure schedule unaffected.

Thus, there is a need for a method and a system for making a temporary one-time change to a primary departure schedule, and more particularly a method and a system for immediately charging the vehicle or making a one-time change only to the next departure time without affecting the future departure dates or times of the primary departure schedule. There is also a need for a method and a system that would recalculate the date and time to begin the charging and pre-climate operation, without any user interaction, based on the primary departure schedule after the one-time charging and/or pre-climate operation has ended.

SUMMARY

The present invention relates to a method and a system for setting a one-time departure schedule, and more particularly to a method and a system for charging immediately or setting a one-time temporary departure schedule without changing a primary departure schedule. In one embodiment, the present invention can be, for example, a computer-based method for allowing a one-time temporary change to a primary departure schedule of a vehicle, including: receiving, using an Electronic Control Unit (ECU) and from a user of the vehicle, a primary departure schedule on a weekly recurring basis for activating a Battery Management and Charging Unit (BMCU) of the vehicle to perform a charging operation of a battery of the vehicle or for activating a Heating, Ventilation and Air Conditioning (HVAC) unit of the vehicle to perform a pre-climate operation; calculating, using the ECU and without any user interaction, the date and time to begin charging or pre-climate operation based on the time period remaining until the next departure date and time of the primary departure schedule; receiving, using the ECU and from the user, an alternate departure date and time different from the primary departure schedule for performing the charging or pre-climate operation; deactivating, using a signal transmitted by the ECU, the BMCU to temporarily prevent the charging operation or the HVAC unit to temporarily prevent the pre-climate operation based on the primary departure schedule until the alternate date and time has passed; activating, using a signal transmitted by the ECU, the BMCU to perform the charging operation at a date and a time in advance of the alternate departure date and time; and returning, using the ECU, to the primary departure schedule after the alternate departure date and time has passed.

In another embodiment, the present invention can be a computer-based method for allowing a one-time temporary change to a primary departure schedule of a vehicle, including: receiving, using an ECU and from a user of the vehicle, a primary departure schedule for activating a BMCU of the vehicle to perform a charging operation of a battery of the vehicle or for activating an HVAC unit of the vehicle to perform a pre-climate operation; receiving, by the ECU and from the user, either an immediate charge mode designation or a departure schedule; setting, using the ECU, a current charge mode for the vehicle to an immediate charge mode when the most recent received charge mode designation is an immediate charge mode designation; deactivating, using a signal transmitted by the ECU, the BMCU to temporarily prevent the charging operation or the HVAC unit to temporarily prevent the pre-climate operation based on the primary departure schedule during the time period which the current charge mode is set to the immediate charge mode; activating, using a signal transmitted by the ECU, the BMCU to perform the charging operation when the current charge mode is set to the immediate charge mode; and returning, using the ECU and without any user interaction, the current charge mode to a primary departure charge mode when the charging operation during the immediate charge mode has ended.

In yet another embodiment, the present invention can be a vehicle including: a BMCU having a Battery Management System (BMS) and a charger, the BMS coupled to the battery and the charger, and the charger coupled to the battery and an external power source; an ECU coupled to the charger and the BMS; and a display coupled to the ECU, an HVAC unit coupled to the ECU, wherein the ECU is configured to: receive from a user of the vehicle, a primary departure schedule which recurs on a weekly basis for activating the charger to perform a charging operation or for directing an HVAC unit to perform a pre-climate operation; receive from the user, a charge mode designation of either an immediate charge mode or a departure schedule; set a current charge mode to an immediate charge mode when the most recent received charge mode designation is an immediate charge mode designation; deactivate, by transmitting a signal, the charger to temporarily prevent the charging operation or the HVAC unit to temporarily prevent the pre-climate operation based on the primary departure schedule during the time period which the current charge mode is set to the immediate charge mode; activate, by transmitting a signal, the charger to perform the charging operation when the current charge mode is set to the immediate charge mode; return, without any user interaction, the current charge mode to the primary departure charge mode when the charging operation during the immediate charge mode has ended; recalculate, without any user interaction, a date and a time to begin the charging or pre-climate operation when the current charge mode is returned to the primary departure charge mode based on the time period remaining until the next departure date and time of the primary departure schedule; and activate, by transmitting a signal, the charger to perform the charging operation or the HVAC unit to perform the pre-climate operation based on the recalculated date and time when the current charge mode is returned to the primary departure charge mode.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Figure 1:
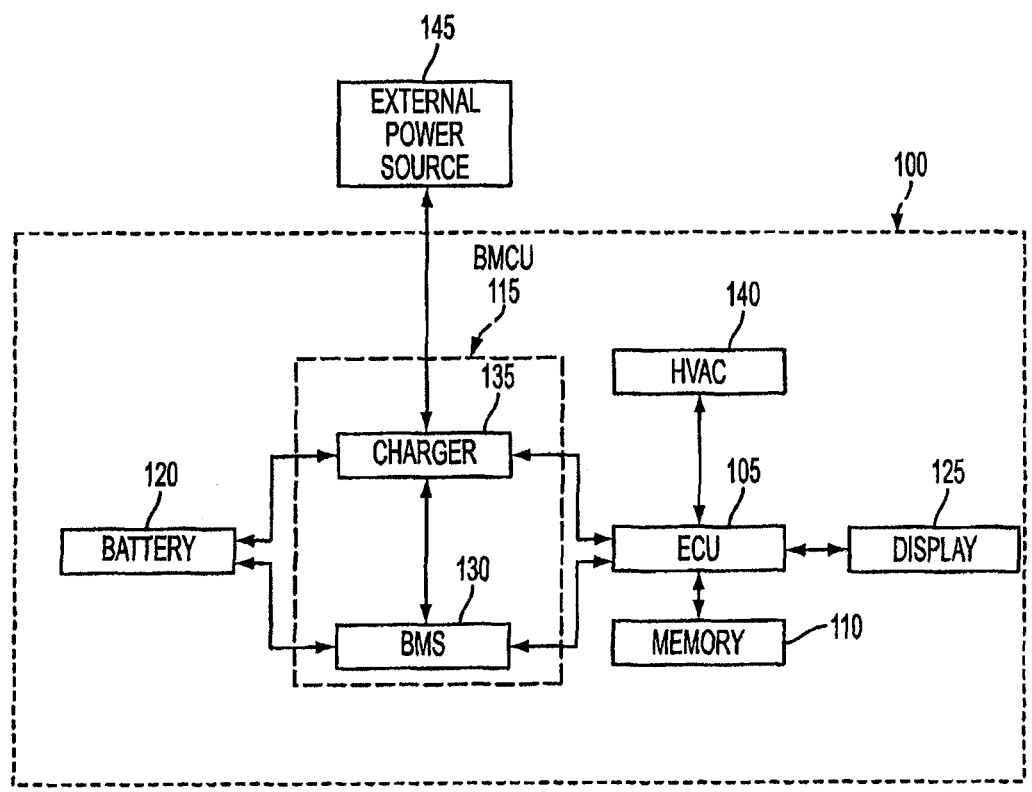
FIG. 1 is a block diagram of a system of a vehicle according to an embodiment of the present invention.

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

Referring to FIG. 1, a block diagram is shown of a vehicle 100 according to an embodiment of the present invention. The present invention includes a system for making a one-time change to a primary departure schedule. In FIG. 1, the system is the vehicle 100, but the system can be, for example, a transportation device, an automated device or any other type of device which moves and is capable of utilizing a rechargeable battery. The vehicle 100 may include an Electronic Control Unit (ECU) 105, a memory 110, a Battery Management and Charging Unit 115 (hereinafter referred to as "BMCU 115"), a battery 120, a display 125 and an HVAC (Heating, Ventilation and Air Conditioning) unit 140. The BMCU 115 may include a Battery Management System (BMS) 130 and a charger 135. The charger 135 may be coupled to an external power source 145 as shown in FIG. 1.

In one embodiment, the ECU 105 may be a processor which controls and communicates with various components of the vehicle 100 by transmitting an electronic signal through a Control Area Network (CAN) bus. In other embodiments, the control and communication between the ECU 105 and other units of the vehicle 100 may be over other types of serial communication links, a direct wiring, a digital communication bus, wireless communications or other communication links.

In one embodiment, the memory 110 stores an algorithm that is used by the ECU 105 to provide and display interfaces for a one-time departure schedule setup. The memory 110 may also store data corresponding to a primary departure schedule set by the user. In the alternative, the memory 110 may be integral to the ECU 105. The ECU 105 and the memory 110 may reside in an Application Specific Integrated Circuit (ASIC). The ASIC may reside in a wireless modem. In the alternative, the ECU 105 and memory 110 may reside as discrete components in the wireless modem.

In one embodiment as shown in FIG. 1, the BMCU 115 is coupled to the external power source 145. The external power source 145 includes an A.C. power source which is coupled to an external charger positioned outside the vehicle 100. The external charger may be any of the various types of electric vehicle charging stations, wall-mountable electric charging solutions or electric vehicle supply equipments utilized in residential or commercial settings. The external charger is coupled to the charger 135 which may be positioned inside the vehicle 100 in one embodiment of the present invention as shown in FIG. 1. The charger 135 may be coupled to or include an A.C. to D.C. converter for converting the A.C. voltage or current received from the external power source 145 to D.C. voltage or current directed to the battery 120. In an alternative embodiment, the external power source 145 may be coupled to the charger 135 or the BMS 130 without using an external charger. In yet another embodiment, the external power source 145 may be a D.C. power source. In such embodiment, the charger 135 would not be required to be coupled to or include an A.C. to D.C. converter, and the vehicle 100 may include a D.C. to D.C. converter.

The BMS 130 monitors the charging operation of the battery 120 using sensors that monitor the current in or out of the battery 120, the voltage, the temperature, the leak current, the state of health, the SOC and/or other state and parameters of the battery 120. In one embodiment, the battery 120 may include multiple battery cells, and the BMS 130 is capable of monitoring and controlling the cells of the battery 120. The BMS 130 can determine the state of health of the cells of the battery 120 by evaluating the charge acceptance, internal resistance, voltage and self-discharge of the cells of the battery 120. In one embodiment, the BMS 130 includes a separate processor from the ECU 105 which can transmit control signals to relays for selectively activating a connection of the battery 120 to various loads positioned inside the vehicle 100. The loads can be, for example, various units or devices of the vehicle 100 having programmable memory items. In one embodiment, the BMS 130 communicates the monitored parameters to the charger 135 or the ECU 105. In another embodiment, the SOC is reported as a percentage relative to the current charging capacity of the battery 120.

The BMCU 115 determines that a charging operation is unnecessary when the battery 120 is already adequately charged according to an embodiment of the present invention. The BMS 130 may transmit a signal to the charger 135 corresponding to the SOC of the battery 120. If the SOC is above a certain predetermined threshold, the charger 135 or the BMS 130 determines that the battery 120 is adequately charged. In such embodiment, the charger 135 does not conduct any charging operation even if directed by the ECU 105 to conduct a charging operation and will transmit a signal to the ECU 105 corresponding to the measured SOC. In another embodiment, the battery 120 is adequately charged when the SOC exceeds a predetermined threshold which is a percentage relative to the current charging capacity of the cells of the battery 120. For example, the threshold may be as high as the battery 120 can be charged. In yet another embodiment, the threshold may be a SOC percentage between 80% and 100%. Alternatively, the SOC may be measured as a percentage relative to a fixed reference charging capacity for the battery 120.

If the ECU 105 does not receive any one-time alternate departure schedule or immediate charging designation, the ECU 105 calculates the date, time and duration of the charging operation based on a departure schedule that the user has set previously. When the ECU 105 transmits a signal to the charger 135 for activating the charging operation, the BMCU 115 directs the converted voltage/current to the battery 120 in order to charge the battery 120. In one embodiment, a pre-climate operation begins, without any user interaction, during a pre-determined time period before the next departure date and time if the user has selected this option during departure schedule setting. For example, the ECU 105 may activate the HVAC unit 140 to perform a pre-climate operation approximately 20 minutes in advance of the next departure date and time in order for the climate inside the vehicle 100 to be adjusted according to the requested pre-climate settings at the next departure time.

Figure 2:
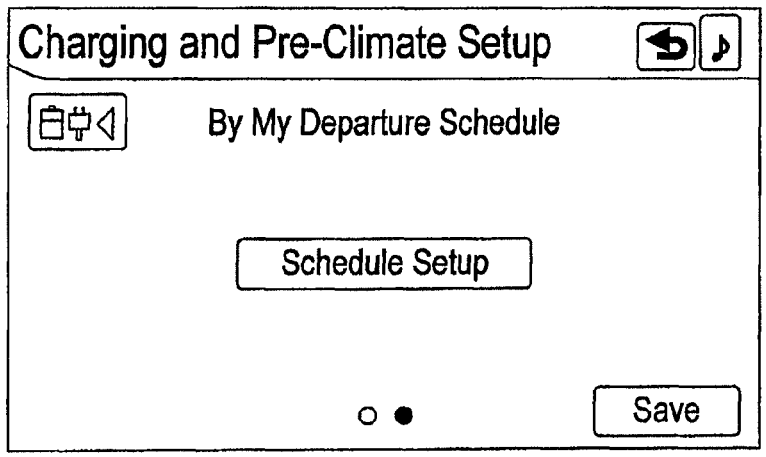
FIG. 2 is a graphical user interface of a schedule setup screen for setup of a primary charging and/or pre-climate operation based on a primary departure schedule according to an embodiment of the present invention.

FIG. 2 is a graphical user interface of a schedule setup screen for setup of a primary charging or a pre-climate operation based on a primary departure schedule according to an embodiment of the present invention. In one embodiment, the user can set a primary departure schedule based on the user's daily activities. For example, the user can select "Schedule Setup," using the display 125, as shown in FIG. 2 for selecting the days of the week and the corresponding times when the user expects to depart prior to the daily activities. After selecting the "Save" option as shown in FIG. 2, the ECU 105 stores the departure schedule data in the memory 110. In an alternative embodiment, the ECU 105 may store the departure schedule data in an internal memory of the ECU 105.

Figure 5:
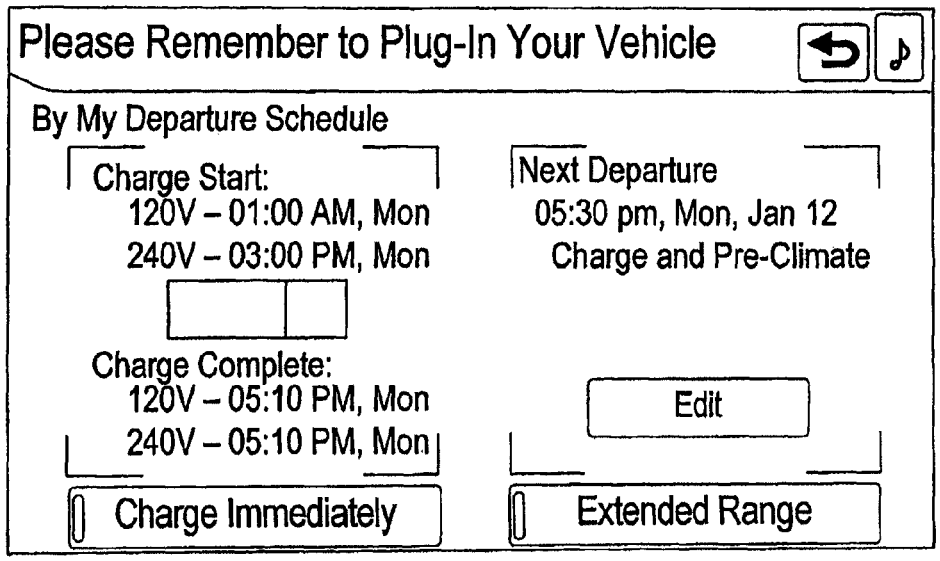
FIG. 5 is a graphical user interface of a departure schedule for charging start and complete times and departure time and day for pre-climate and/or charging operations according to an embodiment of the present invention.

In one embodiment, the ECU 105 activates a "good-bye display" on the display 125 during a time period after the user has requested to shut down the vehicle 100. For example, the ECU 105 may activate the "good-bye display" to be on for 30 seconds after the shut-down request in order to display a graphical user interface of a schedule setup screen as depicted in FIG. 5. This would allow the user to decide whether to charge the vehicle 100 according to the primary departure schedule or to make a one-time change to the primary departure schedule. The one-time change may be an alternate departure schedule for the next departure. Alternatively, the one-time change may be an immediate charging designation which would initiate the charging operation as soon as the external power source 145 is connected to charger 135.

Figure 3:
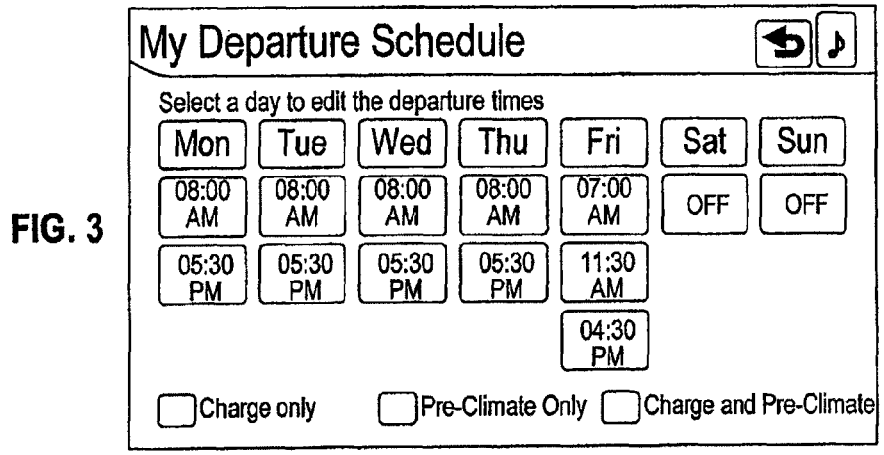
FIG. 3 is a graphical user interface of a departure schedule setup screen to allow the user to select a day to edit the departure times for charge only, pre-climate only or charge and pre-climate according to an embodiment of the present invention.

FIG. 3 depicts a graphical user interface of a departure schedule setup screen of the display 125 which allows the user to enter or edit departure times for each day of the week and designate whether the vehicle 100 activates the charging operation only, pre-climate operation only or both charge and pre-climate operations in advance of the scheduled departure times according to an embodiment of the present invention. For example, the departure schedule as shown in FIG. 3 is set for only weekdays. Saturday and Sunday shown as "Sat" and "Sun" are associated with "OFF," thereby indicating that no charging or pre-climate operation is set for the weekends. The setup screen allows for editing the departure times on each day of the week. For example, the user can select the day Monday shown as "Mon" in order to change the departure times each/every Monday as currently set in the embodiment shown in FIG. 3. In one embodiment, each departure time as shown in FIG. 3 is color coded based on the type of the scheduled operation for the departure time. For example, each of the three types of operations for a particular departure time (the charge only, pre-climate only or charge and pre-climate) is displayed in a distinct color on the graphical user interface shown in FIG. 3. For example, in order to provide the user with a reference regarding which operation each color is associated with, the block adjacent to the charge only operation in the left bottom of FIG. 3 may be displayed in purple, the block adjacent to the pre-climate operation in yellow and the block adjacent to the charge and pre-climate operation in pink. Each block containing a departure time is displayed in the corresponding color of the scheduled operation for the departure time. For example, the departure time of "05:30 PM" on Monday as illustrated in FIG. 3 may be displayed in pink if the scheduled operation for the departure time is a "Charge and Pre-Climate" operation.

Figure 4:
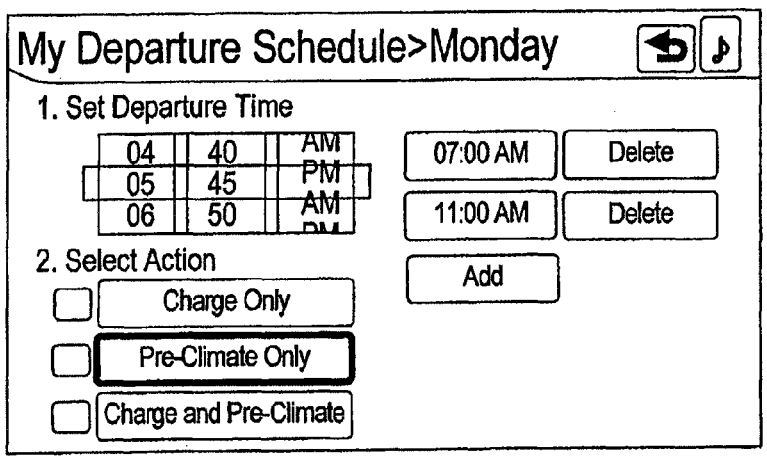
FIG. 4 is a graphical user interface of a departure schedule setup screen after the user has selected to edit the departure time for Monday according to an embodiment of the present invention.

FIG. 4 is a graphical user interface of a departure schedule setup screen after the user has selected to edit the departure time for Monday according to an embodiment of the present invention. When the user selects "Charge Only," the ECU 105 calculates the time and the duration of the charging operation of the BMCU 115 in order for the battery 120 to be adequately charged in advance of the next scheduled departure. No pre-climate operation is conducted prior to the designated time of departure on the day selected. If the user selects "Pre-Climate Only," no charging operation is conducted, and only pre-climate operation is conducted within a pre-determined time period before the designated departure date and time. In one embodiment, the ECU 105 directs the HVAC unit 140 to perform the pre-climate operation approximately 20 minutes before the scheduled departure time and date. If the "Charge and Pre-Climate" option is selected, both pre-charging and pre-climate operations are conducted before the scheduled date and time of departure.

The logical modules and steps for the HVAC 140 unit may be embodied directly in hardware, in a software module executed by the ECU 105, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the ECU 105 such that the ECU 105 can read information from and write information to the storage medium. In the alternative, the storage medium may be integral to the ECU 105. The ECU 105 and the storage medium may reside in an ASIC. The ASIC may reside in a wireless modem. In the alternative, the ECU 105 and the storage medium may reside as discrete components in the wireless modem.

FIG. 4 further depicts the user interface of a departure schedule setup screen which allows multiple departure dates or times to be added. Once a departure date and time is added using "Add" in the display 125, the ECU 105 stores the added departure date and time in the memory 110. The user can also delete a scheduled time of departure by selecting "Delete" positioned adjacent to a corresponding time of departure as shown in FIG. 4. For example, once "Delete" adjacent to "07:00 AM" is selected, the ECU 105 erases only the data corresponding to the 7:00 AM departure time on Monday which was previously stored in the memory 110. The selection of "Delete" does not affect any other future departure times stored in the memory 110.

FIG. 5 is a graphical user interface of a departure schedule for expected "Charge Start" and "Charge Complete" times which are calculated based in part on the next departure date and time. In one embodiment, before the next departure time, the ECU 105 calculates the date, time and duration of the charging operation based in part on the current SOC of the battery 120, the predetermined SOC threshold, the voltage of the external power source 145 and other parameters set forth above. In another embodiment, the calculation may be further based on billing fee rates. For example, certain peak hours of the day are associated with higher fee rates for electricity use due to the high demand for electricity during the peak hours. The ECU 105 can receive and take into account the billing information before designating a charging time period in order to minimize the total cost of the charging operation. The date, time and duration of the charging operation are recalculated because the SOC of the battery 120 and the time period remaining until the next departure date and time has changed after the charging operation under the one-time alternate departure schedule has ended.

The ECU 105 commands the display 125 to display images corresponding to the the charging or pre-climate operation start time, end time, and duration. The display 125 may further display the state of charge of the battery 120 or the vehicle 100, whether pre-climate operation has been cancelled, and/or other parameters of the vehicle 100. For example, in an embodiment as shown in FIG. 5, the graphical user interface of the display 125 may display that charging will start at 1:00 AM and will end at 5:10 PM if a power source of 120 Volts is connected to the vehicle 100 in order for the battery 120 to be adequately charged by the next departure time based on the calculation. The ECU 105 may also command the display 125 to display an image showing that the charging operation will start at 3:00 PM and will end at 5:10 PM if the voltage of the external power source 145 is 240 Volts.

The user can also immediately start the charging operation regardless of the primary schedule dates and times. In an embodiment depicted in FIG. 5, the departure date and time is Monday, January 12, and the next departure time is 5:30 PM. For example, the user may arrive home on Sunday, January 11 at 8:00 PM. and decide to depart at 10:00 PM. before the next scheduled departure time. As such, the user needs to charge the vehicle 100 before departing at 10:00 PM, but the charging operation will not be performed until 1:00 AM or 3:00 PM on Monday as shown on the display 125 depending on the power source as shown in FIG. 5. An embodiment of the present invention, as shown in FIG. 5, allows the user to select "Charge Immediately" and connect the vehicle 100 to the external power source 145 in order to immediately charge the battery 120 without affecting the previously set primary departure schedule.

When the user selects "Charge Immediately," the display 125 communicates with the ECU 105 by transmitting a signal indicating that "Charge Immediately" has been selected. The ECU 105 sets the current charge mode to an immediate charge mode and transmits a signal to the charger 135, activating the charger 135 to perform the charging operation of the battery unit 120. If the BMS 130 determines that the battery 120 is adequately charged, the charger 135 does not start charging the battery 120 as directed by the ECU 105 and transmits a signal to the ECU 105 indicating that the SOC is above the threshold. If the BMS 130 determines that the battery 120 is not adequately charged, the charger 135 starts charging the battery 120. As a result, the battery 120 is charged without affecting the future departure times of the primary departure schedule. In an embodiment, the charger 135 communicates with the BMS 130 in order to perform the charging operation of the battery 120 using the current and power received from the external power source 145.

After the charging operation under the immediate charge mode has ended, the ECU 105 sets the current charge mode to a primary departure charge mode. The ECU 105 has access to data corresponding to the current SOC of the battery 120 based on the information received from the BMS 130. The ECU 105 then recalculates a new time, date, and duration for the charging operation based in part on the current SOC of the battery 120, the time period remaining until the next departure time which is previously saved in the memory 110, billing fee rates and other parameters described above. The date, time and duration of the charging operation are recalculated because the SOC of the battery 120 and the time period remaining until the next departure date and time has changed after the charging operation under the immediate charge mode has ended.

Alternatively, the user can select a one-time alternate departure schedule. In the example shown in FIG. 5, the next departure is set to 5:30 PM on Monday, January 12. For example, if the user seeks to leave before 5:30 PM or at a different date and time or if the user seeks to change the charging and/or pre-climate operation settings, the user can select "Edit" which would edit the next departure time without affecting the primary departure schedule. The primary departure schedule remains unchanged despite the temporary one-time change using an alternate departure time. Recalculation may be performed as described above after the charging operation under the alternate departure time has ended.

Figure 6:
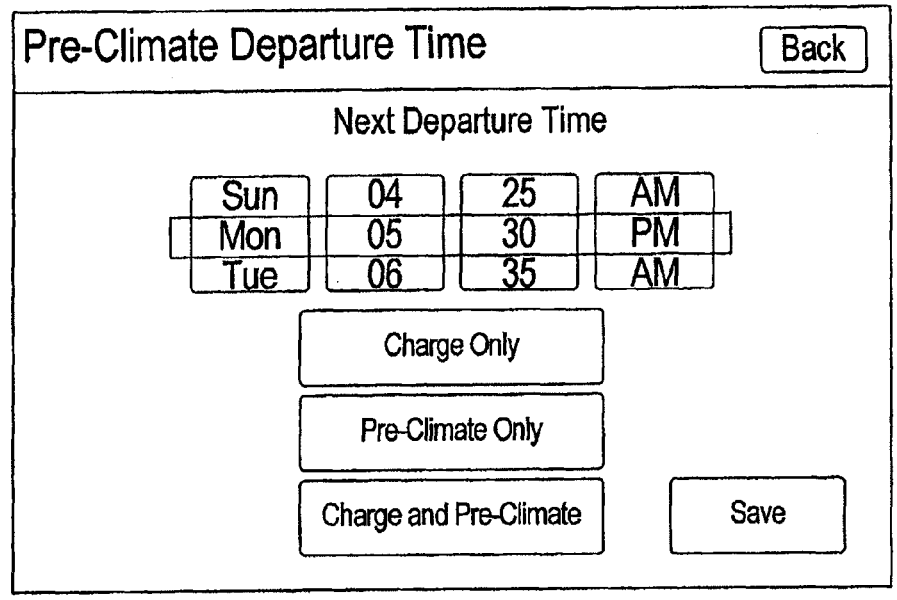
FIG. 6 is a graphical user interface of a pre-climate departure time after the user has selected to edit the schedule for pre-climate and/or charging operations and allows the user to make a one-time change to the charge only, the pre-climate only, or the charging and pre-climate by selecting the next departure date and time and then saving the selection according to an embodiment of the present invention.

FIG. 6 is a graphical user interface of a charging and pre-climate departure time after the user has selected to edit the next departure time, which allows the user to make a one-time change to the charge only, the pre-climate only, or the charge and pre-climate operation as set by the primary departure schedule. The user can select, edit and save the alternate next departure date and time according to an embodiment of the present invention. In one embodiment, when the user sets the next departure time using the display 125, the display 125 communicates the selected data to the ECU 105. As depicted in FIG. 6, the user can select whether a "Charge Only," "Pre-Climate Only" or "Charge and Pre-Climate" operation is performed in advance of the next departure. When the user selects "Save," the ECU 105 controls the memory 110 to save the next departure time without affecting the previously set primary departure schedule, and the ECU 105 activates, by transmitting a signal, the charger 135 to perform the charging operation and/or the HVAC unit 140 to perform the pre-climate operation at the appropriate times respectively. The ECU 105 may recalculate the date, time and duration of the charging operation based on the parameters set forth above.

Figure 7:
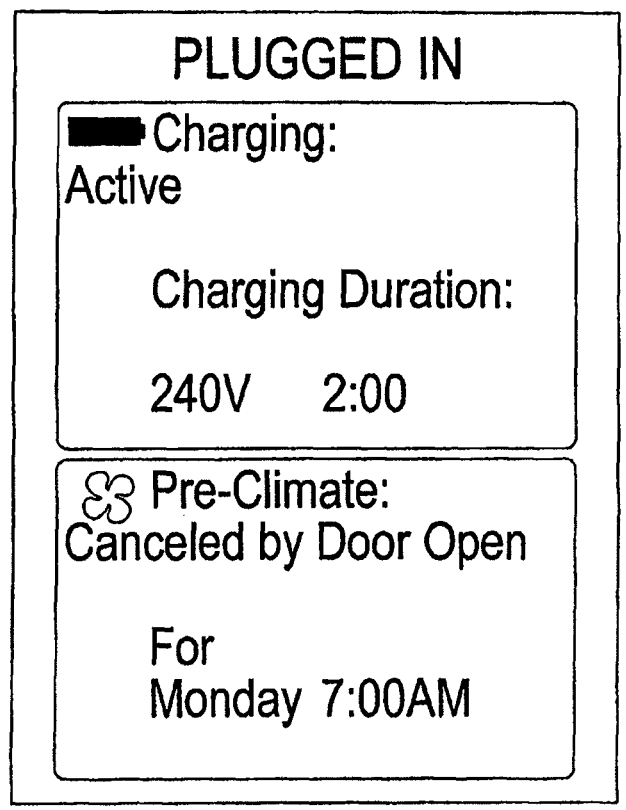
FIG. 7 is a graphical user interface of the display showing the charge state and pre-climate settings that is activated automatically upon opening the driver's door and deactivated upon closing the driver's door or after 30 seconds from activation according to an embodiment of the present invention.

FIG. 7 is a graphical user interface of a dashboard screen of the display 125 which displays an image in the upper section of charging states, including whether the charging operation is currently being performed, the duration of the charging operation and the voltage of the external power source 145. In one embodiment, the display 125 automatically displays the graphical user interface as shown in FIG. 7 without any user interference when the driver's door is opened and stops displaying the graphical user interface upon closing the driver's door or after 30 seconds have passed from opening the driver's door. The charging and pre-air-conditioning information are displayed when the door is opened without turning on the vehicle 100 or pushing a start button. The user can check the charging and pre-air-conditioning information on the display 125 with only the door open. In yet another embodiment, opening any door automatically triggers or turns on power to the display 125 for displaying charging and pre-air-conditioning information—opening other doors will not trigger or activate the display 125. Information such as charge prediction time, charging and pre-air-conditioning schedule or charging and pre-air-conditioning results can be obtained by opening the door without turning on the vehicle 100 or pushing the start button. The screen may also display whether the vehicle 100 is being charged and the duration that the vehicle 100 has been charging as shown in FIG. 7.

As described in details in the preceding paragraphs, when the user seeks to set an alternate departure schedule different from a previously set primary departure schedule, the user previously had to change the primary charging schedule and then redo the primary departure schedule again. Now using the present invention, the user can set an alternate departure schedule while still keeping the future dates or times of charging and pre-climate operation as set by the primary departure unaffected. The user can also immediately charge the battery 120 without affecting the primary departure schedule.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle comprising:
   a battery for storing electrical energy;
   a battery charger for controlling storage of electrical energy in the battery using an external power source;
   a Heating, Ventilation and Air Conditioning (HVAC) unit; and
   an Electronic Control Unit (ECU) communicatively coupled to the battery charger and the HVAC unit, the ECU configured to:
      receive a primary departure schedule having recurring dates or times for at least one of performing one or more charging operations of the battery using the battery charger or performing one or more pre-climate operations using the HVAC unit to adjust an interior climate of the vehicle prior to a departure,
      receive an alternate departure date or time that is different from the recurring dates or times of the primary departure schedule,
      perform at least one of a first charging operation of the battery using the battery charger or a first pre-climate operation using the HVAC unit in advance of the alternate departure date or time, and
      perform at least one of a second charging operation of the battery using the battery charger or a second pre-climate operation using the HVAC unit based on the recurring dates or times of the primary departure schedule after the alternate departure date or time has passed.

2. The vehicle of claim 1, wherein the ECU is further configured to temporarily deactivate at least one of the one or more charging operations or the one or more pre-climate operations that are based on the primary departure schedule until the alternate departure date and time has passed.

3. The vehicle of claim 1, wherein the ECU is further configured to determine a first date or time to perform at least one of the first charging operation or the first pre-climate operation based on a time period remaining until a next departure date or time of the primary departure schedule,
   wherein the step of performing at least one of the first charging operation of the battery using the battery charger or the first pre-climate operation using the HVAC unit is performed based on the determined first date or time.

4. The vehicle of claim 1, wherein the vehicle is connected to the external power source using an electrical cable connection, and
   wherein the received primary departure schedule and the alternate departure date or time are based on user input.

5. The vehicle of claim 1, wherein the ECU is further configured to recalculate, without any user interaction, a date or a time to begin at least one of the second charging operation or the second pre-climate operation after the alternate departure date and time has passed based on a time period remaining until a next departure date or time of the primary departure schedule, and
   wherein the step of performing at least one of the second charging operation of the battery using the battery charger or the second pre-climate operation using the HVAC unit is performed based on the recalculated date or time.

6. The vehicle of claim 5, further comprising a display communicatively coupled to the ECU and configured to display an image based on the recalculated date or time for communicating a status of at least one of the second charging operation or the second pre-climate operation to a user.

7. The vehicle of claim 1, wherein the ECU is further configured to cancel a current pre-climate operation when a door of the vehicle is opened, and the display is further configured to display an image based on whether the current pre-climate operation has been cancelled.

8. The vehicle of claim 1, wherein the ECU is further configured to receive an editing set of primary departure schedule data based on user inputs and modify the primary departure schedule based on the received editing set of primary departure schedule data.

9. The vehicle of claim 1, wherein the battery charger is a part of a Battery Management and Charging Unit (BMCU) that is positioned in the vehicle and further includes a Battery Management System (BMS), wherein the BMS is coupled to the battery and configured to determine a state of charge of the battery and communicate the state of charge of the battery to the ECU, and wherein the ECU is configured to initiate or terminate the first charging operation and the second charging operation based on the state of charge of the battery.

10. The vehicle of claim 1, wherein the battery charger is an external charger positioned outside of the vehicle.

11. A computer-based method for managing charging operations or pre-climate operations of a vehicle, comprising:
    receiving, using an Electronic Control Unit (ECU), a primary departure schedule having recurring dates or times for at least one of performing one or more charging operations of a battery of the vehicle using a battery charger or performing one or more pre-climate operations, using a Heating, Ventilation and Air Conditioning (HVAC) unit to adjust an interior climate of the vehicle prior to a departure;
    receiving, using the ECU, an alternate departure date or time that is different from the recurring dates or times of the primary departure schedule;
    performing at least one of a first charging operation of the battery using the battery charger or a first pre-climate operation using the HVAC unit in advance of the alternate departure date or time; and
    performing at least one of a second charging operation of the battery using the battery charger or a second pre-climate operation using the HVAC unit based on the recurring dates or times of the primary departure schedule after the alternate departure date or time has passed.

12. The method of claim 11, further comprising temporarily deactivating, using a signal transmitted by the ECU, at least one of the one or more charging operations or the one or more pre-climate operations that are based on the primary departure schedule until the alternate departure date and time has passed.

13. The method of claim 11, further comprising automatically determining, using the ECU, a first date or time to perform at least one of the first charging operation or the first pre-climate operation based on a time period remaining until a next departure date or time of the primary departure schedule, wherein the step of performing at least one of the first charging operation of the battery using the battery charger or the first pre-climate operation using the HVAC unit is performed based on the determined first date or time.

14. The method of claim 11, further comprising recalculating, using the ECU and without any user interaction, a date or a time to begin at least one of the second charging operation or the second pre-climate operation after the alternate departure date and time has passed based on a time period remaining until a next departure date or time of the primary departure schedule,
    wherein the step of performing at least one of the second charging operation of the battery using the battery charger or the second pre-climate operation using the HVAC unit is performed based on the recalculated date or time.

15. The method of claim 14, further comprising displaying, using a display, an image based on the recalculated date or time for communicating a status of at least one of the second charging operation of the battery or the second pre-climate operation.

16. The method of claim 11, further comprising:
    cancelling a current pre-climate operation when a door of the vehicle is opened; and
    displaying, using a display, an image based on whether the current pre-climate operation has been cancelled.

17. The method of claim 11, further comprising:
    receiving, using the ECU, an editing set of primary departure schedule data; and
    modifying, using the ECU, the primary departure schedule based on the received editing set of primary departure schedule data.

18. A computer-based system for managing charging operations or pre-climate operations of a vehicle, comprising:
    a battery for storing electrical energy;
    a Battery Management and Charging Unit (BMCU) including a Battery Management System (BMS) and a battery charger, the battery charger configured to control storage of electrical energy in the battery using an external power source;
    a Heating, Ventilation and Air Conditioning (HVAC) unit; and
    an Electronic Control Unit (ECU) communicatively coupled to the battery charger and the HVAC unit, the ECU configured to:
        receive a primary departure schedule having recurring dates or times for at least one of performing one or more charging operations of the battery using the battery charger or performing one or more pre-climate operations using the HVAC unit to adjust an interior climate of the vehicle prior to a departure,
        receive an alternate departure date or time that is different from the recurring dates or times of the primary departure schedule,
        perform at least one of a first charging operation of the battery using the battery charger or a first pre-climate operation using the HVAC unit in advance of the alternate departure date or time, and
        perform at least one of a second charging operation of the battery using the battery charger or a second pre-climate operation using the HVAC unit based on the recurring dates or times of the primary departure schedule after the alternate departure date or time has passed.

19. The computer-based system of claim 18, wherein the ECU is further configured to temporarily deactivate at least one of the one or more charging operations or the one or more pre-climate operations that are based on the primary departure schedule until the alternate departure date and time has passed.

20. The computer-based system of claim 18, wherein the ECU is further configured to recalculate, without any user interaction, a date or a time to begin at least one of the second charging operation or the second pre-climate operation after the alternate departure date and time has passed based on a time period remaining until a next departure date or time of the primary departure schedule, and
    wherein the step of performing at least one of the second charging operation of the battery using the battery charger or the second pre-climate operation using the HVAC unit is performed based on the recalculated date or time.

* * * * *